United States Patent
Li et al.

(10) Patent No.: US 10,459,990 B1
(45) Date of Patent: Oct. 29, 2019

(54) DATA PROCESSING METHOD AND DEVICE, MEDIUM AND TERMINAL THEREOF

(71) Applicant: Silver Rocket Data Technology (Shanghai) Co., Ltd, Shanghai (CN)

(72) Inventors: Jia Li, Shanghai (CN); Yi Yuan, Shanghai (CN); Xiaoliang Pan, Shanghai (CN); Qing Yan, Shanghai (CN)

( * ) Notice: Subject to any disclaimer, the term of this patent is extended or adjusted under 35 U.S.C. 154(b) by 0 days.

(21) Appl. No.: 16/366,043

(22) Filed: Mar. 27, 2019

(30) Foreign Application Priority Data

Dec. 27, 2018 (CN) .......................... 2018 1 1611365
Dec. 27, 2018 (CN) .......................... 2018 1 1611382
Dec. 27, 2018 (CN) .......................... 2018 1 1613014

(51) Int. Cl.
| | | |
|---|---|---|
| G06F 16/00 | (2019.01) | |
| G06F 16/953 | (2019.01) | |
| G06F 16/901 | (2019.01) | |
| H04L 9/06 | (2006.01) | |
| G06F 9/30 | (2018.01) | |
| G06F 16/9035 | (2019.01) | |

(52) U.S. Cl.
CPC ........ *G06F 16/953* (2019.01); *G06F 9/30007* (2013.01); *G06F 16/901* (2019.01); *G06F 16/9035* (2019.01); *H04L 9/0643* (2013.01); *H04L 2209/38* (2013.01)

(58) Field of Classification Search
CPC .............. G06F 16/953; G06F 16/9035; G06F 9/30007; G06F 16/901; H04L 9/0643; H04L 2209/38
See application file for complete search history.

(56) References Cited

U.S. PATENT DOCUMENTS

| | | | |
|---|---|---|---|
| 10,298,401 B1 * | 5/2019 | Goldberg | H04L 9/3239 |
| 2014/0025952 A1 * | 1/2014 | Marlow | H04L 63/0428 |
| | | | 713/168 |
| 2014/0059352 A1 * | 2/2014 | Haga | H04L 9/0822 |
| | | | 713/171 |
| 2018/0137196 A1 * | 5/2018 | Han | G06F 16/9535 |
| 2018/0285996 A1 * | 10/2018 | Ma | G06Q 50/184 |
| 2018/0349617 A1 * | 12/2018 | Wang | G06F 21/602 |
| 2019/0013948 A1 * | 1/2019 | Mercuri | G06Q 20/02 |
| 2019/0018862 A1 * | 1/2019 | Wu | H04L 9/0643 |
| 2019/0164220 A1 * | 5/2019 | Raj | G06Q 20/02 |

FOREIGN PATENT DOCUMENTS

WO  WO/2018/205137  * 11/2018

* cited by examiner

*Primary Examiner* — Alexander Khong
(74) *Attorney, Agent, or Firm* — Fideli Law PLLC

(57) ABSTRACT

A data processing method, apparatus, medium and terminal thereof are disclosed in the present disclosure, the method comprising: determining data-to-be-processed based on data provided by a data provider, the data-to-be-processed includes plaintext description data; storing the plaintext description data to a database, the database may be used to support a search engine; and in response to confirmation of search results from the search engine by a data requestor, triggering a smart contract running on blockchain, the smart contract includes communication and records between the data requestor and the data provider. The technical solution in some embodiments improves search efficiency of data in blockchain technology applications.

24 Claims, 7 Drawing Sheets

US 10,459,990 B1

DATA PROCESSING METHOD AND DEVICE, MEDIUM AND TERMINAL THEREOF

CLAIM OF PRIORITY

This application claims priority to Chinese Application number 201811611382.6, filed on Dec. 27, 2018, Chinese Application number 201811611365.2, filed on Dec. 27, 2018, and Chinese Application number 201811613014.5, filed on Dec. 27, 2018, the contents of which are incorporated herein by reference.

TECHNICAL FIELD

The present disclosure relates to Internet technologies, and more particularly, but not exclusively, to a data processing method, device, medium and terminal thereof.

BACKGROUND

With the development and progress of blockchain technology, the number of its applications and scenarios have increased dramatically. The blockchain has the characteristics of decentralization, non-tamperability, data transparency, user anonymity, and collective maintenance, which makes many systems with high trust requirements build the system based on a blockchain system.

However, in the applications of the existing blockchain technology, the search efficiency of data needs to be improved.

SUMMARY

The technical problem solved by the embodiment of the present disclosure may be to improve the search efficiency of data in applications of the blockchain technology.

To solve the above-mentioned technical problem, some embodiments provide a data processing method, comprising: determining data-to-be-processed based on data provided by a data provider, the data-to-be-processed may include plaintext description data; storing the plaintext description data to a database, the database may be used to support a search engine; and in response to confirmation of search results from the search engine by a data requestor, triggering a smart contract running on blockchain, the smart contract may include communication and records between the data requestor and the data provider.

Alternatively, after triggering the smart contract running on the blockchain, the data processing method may further include: in response to the triggering of the smart contract, transmitting a storage address corresponding to target data to be transmitted (e.g., transaction data) of the data requestor to the data requestor, the target data to be transmitted (e.g., transaction data) may be generated based on the data provided by the data provider.

Alternatively, a transaction object of the smart contract may be target data to be transmitted (e.g., transaction data), and the target data to be transmitted (e.g., transaction data) may be encrypted data generated based on original content data provided by the data provider, the original content data may be generated based on data collected by a collector device; the data-to-be-processed further may include verification data for verifying consistency between the target data to be transmitted (e.g., transaction data) and the original content data; and the data processing method may further include: uploading the verification data to the blockchain.

Alternatively, the data provided by the data provider may include the plaintext description data and the verification data generated corresponding to data collected by the collector device, the verification data may be determined by: identifying data provided by the data provider to obtain the plaintext description data and the verification data.

Alternatively, the data provided by the data provider may include the original content data, and the verification data may be determined: obtaining the original content data from data provided by the data provider; and generating the verification data based on the original content data.

Alternatively, the original content data may include an identification field and data corresponding to the identification field, and the plaintext description data may be determined: identifying the identification field to determine non-private data of the original content data, in some embodiment, the non-private may be desensitization data; and generating the plaintext description data corresponding to the original content data based on the non-private data.

Alternatively, the verification data may be determined as follows: identifying data provided by the data provider to obtain verification sub-data (e.g., the Hash value of each unit data) corresponding to the original content data and original plaintext description data; determining an aggregation quantity based on data types included in the original plaintext description data; determining a set of the original content data including the aggregation quantity; and generating the verification data (e.g., the root Hash value) based on the verification sub-data (e.g., the Hash value of each unit data) corresponding to each of the original content data in the set.

Alternatively, the plaintext description data may be generated based on the set of the original content data including the aggregation quantity and corresponding original plaintext description data.

Alternatively, the determining the data-to-be-processed based on the data provided by the data provider may include: determining the plaintext description data of a preset data dimension; obtaining associated other data by using the plaintext description data of the preset data dimension as an index; associating obtained other data to the plaintext description data.

Alternatively, the data provided by the data provider may include original plaintext description data, and the determining the data-to-be-processed based on the data provided by the data provider may include: translating the original plaintext description data by using a data dictionary to obtain the plaintext description data.

The embodiment further provides a data processing apparatus, comprising: a data generator unit configured to determine data-to-be-processed based on data provided by a data provider, the data-to-be-processed may include plaintext description data; a data storage unit configured to store the plaintext description data to a database, the database may be used to support a search engine; a smart contract trigger unit configured to trigger a smart contract running on a blockchain in response to a confirmation of a search result from the search engine by a data requestor, the smart contract may include communication and records between the data requestor and the data provider.

Alternatively, the apparatus may further include a storage address transmitter unit configured to transmit a storage address corresponding to target data to be transmitted (e.g., transaction data) of the data requestor to the data requestor in response to the triggering of the smart contract after triggering the smart contract running on the blockchain, the target data to be transmitted (e.g., transaction data) may be generated based on the data provided by the data provider.

Alternatively, a transaction object of the smart contract may be target data to be transmitted (e.g., transaction data), and the data generator unit may include: a target data to be transmitted (e.g., transaction data) generator subunit configured to generate encrypted data based on original content data provided by the data provider, the original content data may be generated based on data collected by a collector device, the target data to be transmitted (e.g., transaction data) may be the encrypted data; a verification data determiner subunit configured to determine verification data for verifying consistency between the target data to be transmitted (e.g., transaction data) and the original content data, the data-to-be-processed further may include verification data; the data processing apparatus may further include a data uploader unit configured to upload the verification data to the blockchain.

Alternatively, the data provided by the data provider may include the plaintext description data and the verification data generated corresponding to data collected by the collector device, the verification data determiner subunit may be configured to identify data provided by the data provider to obtain the corresponding plaintext description data and the verification data.

Alternatively, the data provided by the data provider may include the original content data, and the verification data determiner subunit may include: an original content data obtainer module configured to obtain the original content data from data provided by the data provider; and a verification data generator module configured to generate the verification data based on the original content data.

Alternatively, the original content data may include an identification field and data corresponding to the identification field, and the data generator unit may further include a plaintext description data determiner subunit configured to determine the plaintext description data; the plaintext description data determiner subunit may include: a non-private data identifier module configured to identify the identification field to distinguish the non-private data of the original content data; and the plaintext description data generator module configured to generate the plaintext description data corresponding to the original content data based on the non-private data.

Alternatively, the verification data determiner subunit may include: an identifier module configured to identify data provided by the data provider to obtain verification sub-data (e.g., the Hash value of each unit data) corresponding to the original content data and original plaintext description data; an aggregation quantity determiner module configured to determine an aggregation quantity based on data types included in the original plaintext description data; a set determiner module configured to determine a set of the original content data including the aggregation quantity; a verification data generator module configured to generate the verification data based on the verification sub-data (e.g., the Hash value of each unit data) corresponding to each of the original content data in the set.

Alternatively, the plaintext description data may be generated based on the set of the original content data including the aggregation quantity and corresponding original plaintext description data.

Alternatively, the data generator unit may include: a multi-dimensional plaintext description data determiner subunit configured to determine the plaintext description data of a preset data dimension; an indexer subunit configured to obtain associated other data by using the plaintext description data of the preset data dimension as an index; an association subunit configured to associate obtained other data to the plaintext description data.

Alternatively, the data provided by the data provider may include original plaintext description data, and the data generator unit may include a translator subunit configured to translate the original plaintext description data by using a data dictionary to obtain the plaintext description data.

The embodiment further provides a computer readable storage medium with computer instructions stored thereon, that when executed, perform the steps of any of the above-mentioned data processing methods.

The embodiment still further provides a terminal comprising a memory with computer instructions stored thereon and a processor, the computer instructions are executable on the processor, and when executed by the processor, perform the steps of any of the above-mentioned data processing methods.

The technical solutions of the embodiment have the following beneficial effects compared with the prior art:

In some embodiments, the data-to-be-processed may be determined based on the data provided by the data provider, the plaintext description data in the data-to-be-processed may be stored in the database, and the plaintext description data stored in the database may be searched by the data requestor with the search engine. After confirming the search results of the search engine, the smart contract running on the blockchain may be triggered. Since the search engine searches based on the plaintext description data stored in the database, the search efficiency may be higher than that of searching the blockchain directly. After the data requestor confirms the search results, the smart contract running on the blockchain may be triggered in response to the confirmation operation of the data requestor and the communication and records between the data provider and the data requestor may be done by the smart contract, which may be used for providing the security of the transaction after searching, improving search efficiency and guarantee safe transactions.

Further, the verification data for verifying the original content data uploaded to the blockchain may be unchangeable by generating verification data for verifying the reliability of the original content data and uploading the verification data to the blockchain, thereby, after the data transaction, the data requestor may verify the purchased data according to the verification data on the blockchain and may verify the authenticity of the purchased original content data.

Further, the non-private data in the original content data may be determined by the identification field of the original content data, and the plaintext description data corresponding to the original content data may be generated according to the non-private data, and when the search engine performs the plaintext description data search, only the data provider's non-private data may be searched, which may protect the data provider's data security.

Further, the data dimension preset by the plaintext description data may be used as an index to obtain other data associated with the preset data dimension and the other data may be associated with the plaintext description data, so that the data dimension of the plaintext description data may be extended. Search engines may perform data searches from more data dimensions, which may increase the probability that data will be searched. Moreover, data searched from more data dimensions may also improve the accuracy of data searches.

Further, the plaintext description data suitable for the search engine may be obtained by using the data dictionary to translate the original plaintext description data, thereby facilitating the searches of the search engine and improving the efficiency of the data searches. Moreover, by translating the data to obtain the plaintext description data, the probability that the data may be searched may be improved, and the search performance of the search engine may be improved.

According to an aspect of the present disclosure, a system for communicating with a blockchain may include: one or more blockchain interfaces configured to connected to the blockchain; one or more requestor interfaces configured to interact with a data requestor; one or more search engines configured to access a database stored in one or more storage units; and one or more computer servers. The one or more computer servers may be in connection with: the one or more blockchain, via the one or more blockchain interface, to communicate with the blockchain, the one or more requestor interfaces to communicate with the data requestor, and the one or more search engines. During operation, the one or more computer servers may direct the one or more search engines to select target data to be transmitted from the database based on one or more indexing label of at least one unit of data-to-be-processed according to a search request associated with the data requestor; activate a smart contract stored and running on the blockchain; and operate, according to instructions sent by the smart contract from the blockchain.

In some aspects of the present application, to operate according to instructions sent by the smart contract from the blockchain, the one or more computer servers may further transmit one or more storage addresses corresponding to the target data to be transmitted to the data requestor according to the smart contract running on the blockchain.

In some aspects of the present application, the one or more storage units may be centralized storage units; the database may include the at least one unit of data-to-be-processed; each unit of data-to-be-processed may include one or more indexing labels searchable by the search engine.

In some aspects of the present application, to select the target data to be transmitted from the database, the one or more search engines may further search the at least one unit of target data to be transmitted based on the one or more indexing labels of the at least one unit of processed data.

In some aspects of the present application, wherein during operation, the one or more computer servers may further: receive a data request from the data requestor; upload the data request to the blockchain via the one or more blockchain interfaces to generate the smart contract on the blockchain, wherein the smart contract may include a set of instructions to direct the one or more computer servers, via the one or more blockchain interfaces, to conduct predetermined operations. The predetermined operations may be In some aspects of the present application, the data request may include the search request and a requirement to a search result associated with the search request. For example, the requirement may include that the data collection data must be within certain time period, and/or only the first 100 units of the target data to be transmitted may be selected, etc.

In some aspects of the present application, the predetermined operations may include: determining whether the target data to be transmitted meet the requirement; in responding to a determination that the target data to be transmitted meet the requirement, send an activation signal to the smart contract via any one of the blockchain interfaces to activate the smart contract.

In some aspects of the present application, the determining of whether the target data to be transmitted meet the requirement may include receiving an instruction from the data requestor indicating whether the target data to be transmitted meet the requirement; and/or automatically comparing the target data to be transmitted with a preset criterion associated with the requirement in the smart contract. For example, the instruction may be a confirmation manually inputted by the data requestor, showing that the search result meets the data requestor's need. The instruction may also be automatically generated by the computer server, either by a decision on its own, or through an instruction from the smart contract over the blockchain.

In some aspects of the present application, the predetermined operations may further include directing the one or more search engines to conduct a selection from the database based on the search request. For example, the smart contract may be generated by the one or more computer server and/or the data requestor prior to the search. According to predetermined provisions in the smart contract, the smart contract may instruct the one or more computer servers to conduct the search, which further defer the search operation to the one or more search engines.

In some aspects of the present application, during operation, the one or more computer servers may further: receive at least one unit of original data from at least one data provider, wherein each of the at least one unit of the original data may include non-private plaintext data, cyphered data, and verification data (e.g., Hash value of the raw data transmitted from a sensor of a target device) associated with the cyphered data.

In some aspects of the present application, each unit of the at least one unit of original data may be obtained by at least one data provider device through a procedure of: receiving raw data directly measured from a target device; identifying the non-private plaintext data from the raw data; identify private data from the raw data; cyphering the raw data into the cyphered data; and transforming the raw data to the verification data.

In some aspects of the present application, for each unit of the at least one unit of original data, the computer server may further process the original data into the data-to-be-processed by: identifying the non-private plaintext data from the original data; updating the non-private plaintext data by adding additional non-private content associated with the non-private plaintext data into the non-private plaintext data; obtaining the verification data; and directing the blockchain unit to upload the verification data to the blockchain.

In some aspects of the present application, during operation, the one or more computer servers may further: extracting index information from the updated non-private plaintext data for search; adding the one or more indexing labels to the updated non-private plaintext data according to the index information.

In some aspects of the present application, the one or more computer servers may further: transform all verification data in the target data to be transmitted to a root verification data; upload the root verification data to the blockchain; and send the root verification data to the data requestor according to the instructions sent by the smart contract.

BRIEF DESCRIPTION OF THE DRAWINGS

Non-limiting and non-exhaustive embodiments of the present disclosure are described with reference to the following figures, wherein like reference numerals refer to like parts throughout the various views unless otherwise specified.

DETAILED DESCRIPTION

Figure 1:
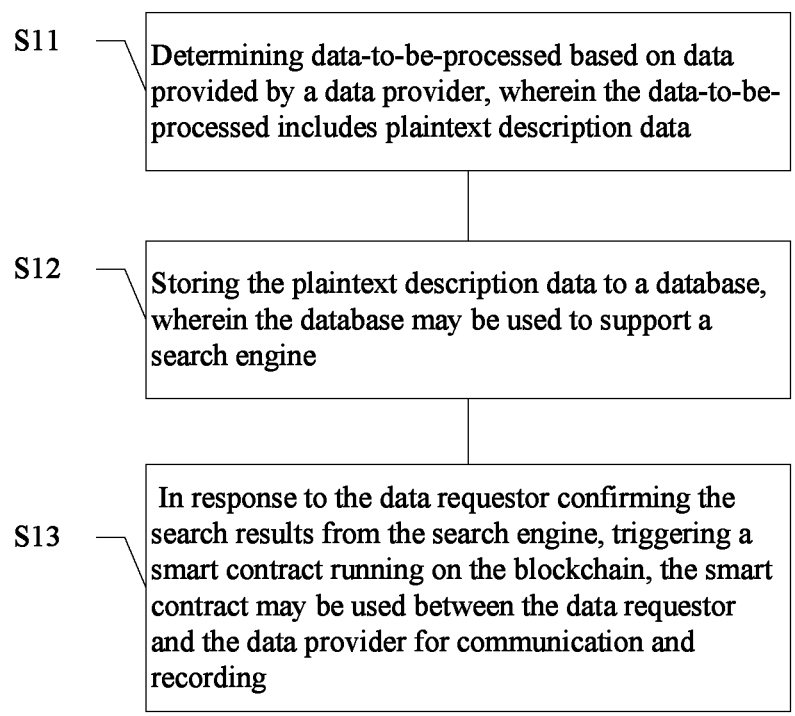
FIG. 1 is a flowchart illustrating a data processing method according to embodiments of the present disclosure.

Various aspects and examples of the invention will now be described. The following description provides specific details for a thorough understanding and enabling description of these examples. Those skilled in the art would understand, however, that the invention may be practiced without many of these details. Additionally, some well-known structures or functions may not be shown or described in detail, so as to avoid unnecessarily obscuring the relevant description.

The terminology used in the description presented below may be intended to be interpreted in its broadest reasonable manner, even though it may be being used in conjunction with a detailed description of certain specific examples of the invention. Certain terms may even be emphasized below, however, any terminology intended to be interpreted in any restricted manner will be overtly and specifically defined as such in this Detailed Description section.

As used herein, the singular forms "a," "an," and "the" may be intended to include the plural forms as well, unless the context clearly indicates otherwise. It will be further understood that the terms "comprises," "comprising," "includes," and/or "including" when used in this specification, specify the presence of stated features, integers, steps, operations, elements, and/or components, but do not preclude the presence or addition of one or more other features, integers, steps, operations, elements, components, and/or groups thereof.

The flowcharts used in the present disclosure illustrate operations that systems implement according to some embodiments in the present disclosure. It is to be expressly understood, the operations of the flowchart may or may not be implemented in order. Conversely, the operations may be implemented in inverted order, or simultaneously. Moreover, one or more other operations may be added to the flowcharts. One or more operations may be removed from the flowcharts.

As described above, in the blockchain applications, the existing search efficiency of data needs to be improved.

For example, data provided by the data provider may be uploaded to the blockchain by a system, and the plaintext data stored on the blockchain, which may be associated with the data from the data provider, may be directly searched by a search engine when a data requestor needs to obtain the data. Because the data on the blockchain may be stored through decentralization. The search engine needs to perform the data search on each storage node of the blockchain to determine whether the data stored in each storage node meets the requirements of the data requestor. Because of the need to access the storage node for data search, the search may be slower and less efficient.

The following part of the present application may provide a problem solution.

According to embodiments of the present disclosure, a system or data processing platform may determine data-to-be-processed based on the data provided by the data provider. The data-to-be-processed may include plaintext description data, which may be stored in a database (e.g., a centralized database). A smart contract running on a blockchain may be triggered after the data requestor searches the plaintext description data stored in the database by using the search engine and confirms the search results of the search engine.

Since the search conducted by the search engine is based on the plaintext stored in the database, especially when the database is a centralized database, the search efficiency may be higher than that of directly search on the blockchain. After the data requestor confirms the search result, the smart contract running on the blockchain may be triggered in response to the data requestor's confirmation operation. Here, a smart contract is a computer protocol running on a blockchain, which intendeds to digitally facilitate, verify, or enforce the negotiation or performance of a contract. Smart contracts allow the performance of credible transactions without third parties. These transactions are trackable and irreversible. Accordingly, after being triggered, the smart contract may keep track on the communications and recordation between the data provider and the data requestor. Therefore, the smart contract may provide the security of the transaction after searching, improve search efficiency and protect transaction safety.

The above-mentioned purposes, features and advantages will become more apparent from the detailed description of the embodiments.

Referring to the flowchart of a data processing method shown in FIG. 1 in accordance with embodiments of the present disclosure, the data processing method may include the following steps:

Step S11, determining data-to-be-processed based on data provided by the data provider, wherein the data-to-be-processed includes plaintext description data. For example, the data-to-be-processed may be determined by one or more computer servers.

Step S12, storing the plaintext description data to a database, wherein the database may be used to support a search engine. For example, the one or more computer servers may store the plaintext description data to a centralized database.

Step S13, in response to the data requestor confirming the search results from the search engine, triggering a smart contract running on the blockchain, the smart contract may be used between the data requestor and the data provider for communication and recording. For example, the one or more computer servers may trigger the smart contract. The confirmation of the search result may either come from the data requestor or may be generated by the one or more computer servers in accordance with predetermined criteria from the smart contract.

Figure 2:
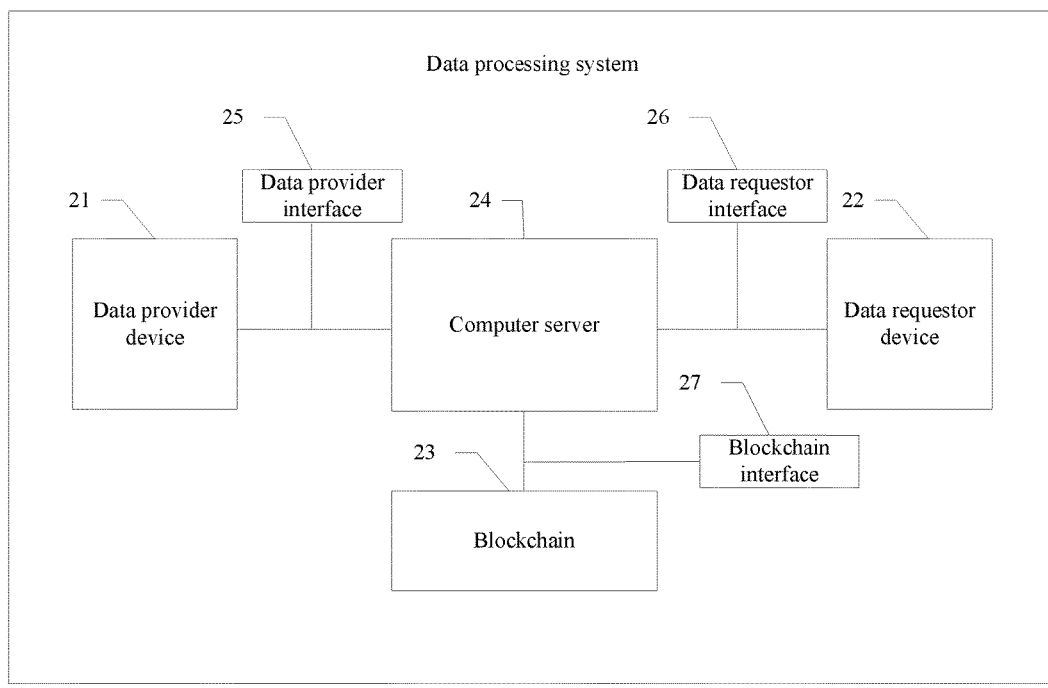
FIG. 2 is a schematic structural diagram illustrating a data processing system according to embodiments of the present disclosure.

FIG. 2 shows a data processing system. The system may include a data provider device 21, a data requestor device 22, a blockchain 23, all connected to and in communication with one or more computer servers 24.

In some embodiments, a data provider may correspond to the data provider device 21 in FIG. 2, which may include a smart terminal, a collector device for data collection, or a third party in cloud. The data provider device 21 may be a party that direct collect raw data and then send the raw, unprocessed data to the centralized server 24. Alternatively or additionally, to ensure the raw data will not be altered and/or tampered during later data transmissions, the data provider device 21 may also process the raw data into a predetermined condition before sending the data to the centralized server 24. For example, the predetermined condition may be original data, i.e., the data provider device 21 may convert and/or transform the raw data to the original data with a unified format, which may include cyphered data/texts of the raw data, plaintext description data (or metadata) of the raw data, as well as a verification data (e.g., a Hash value) of the raw data.

For example, the data provider device 21 may conduct the following operations: 1. determine a Hash value of the raw data using a Hash function; 2. cypher/encrypt the raw data to cyphered data/texts. Means for cyphering/encrypting the raw data/texts is introduced elsewhere in the present application. 3. distinguish, classify and/or determine non-private contents (or public contents) and private contents (or non-public contents) from the raw data. 4. convert the raw data to the unified format to include plaintext description data (or metadata) of the raw data, the cyphered data/texts, as well as the Hash value as a verification data of the raw data.

Here, the hash function may be any function that is used to map data of an arbitrary size (input) to a fixed size output. The resulting Hash value from the arbitrary input is not only fixed in length, but also completely unique to the input. A slightly change in the input may result huge difference in the output Hash value. The Hash function itself is deterministic and irreversible. That is, no matter how many times one runs the function on the same input, the output will always be the same. What is more, one cannot determine the input from the output. The plaintext description data may be the non-private contents of the raw data. The non-public or private content may be information substantial to the purpose of collecting the data, related to privacy of a particular party and/or of substantial commercial value. Non-private content may be information not substantial to the purpose of collecting the original data, not sensitive to the privacy of the third party, and/or not of particular commercial value. For example, the tire pressure data may be of substantial value to evaluate a specific vehicle model or may be of particular commercial value or may be the main reason that the original data are collected. On the other hand, the timestamp may be classified as public information, because it is not substantial to the purpose of collecting the original data, not sensitive to the privacy of the third party, and/or not of particular commercial value.

Details of processing the raw data may be further introduced elsewhere in the present application.

In some embodiments, a data requestor may correspond to a data requestor device 22, which may include a manufacturer, an insurance company, an individual or a service provider who wants to obtain data, etc.; the blockchain 23 may be Ethereum (ETH), a commercial distributed design blockchain operating system (EOS) or other blockchains.

According to embodiments of the present application, the one or more computer servers 24 may include a centralized server. For illustration purpose, the present application takes the centralized server as a representation of the one or more computer servers 24. However, one of ordinary skill in the art would understand that the computer server may also be a distributed system or any other type of system suitable for the purpose of the present application. Further, one of ordinary skill in the art would also understand, after reading this specification, that since the one or more computer servers 24 may connect to and communicate with the data provider device 21, the data requestor device 22, and the blockchain 23, to ensure the connections and communications, naturally the one or more computer servers 24 may connect to connection ports and/or interfaces, which are configured to respectively connect to the data provider device 21, the data requestor device 22, and the blockchain 23. For example, the connection ports may be at least one of data transmission port, data transmission device, modem, or any data transmission devices that connected to server 24 to the blockchain, the data provider devices, and the data requestor devices etc. Specifically, the at least one connection pots and/or interfaces may include at least one blockchain port/interface to connect to and communicate with the blockchain 23, at least one data requestor port/interface to connect to and communicate with the data requestor device 22; and at least one data provider port/interface to connect to and communicate with the data provider device 21. Moreover, as will be introduced in detail elsewhere in the present application, one of ordinary skill in the art would also understood, after reading this specification, that the one or more computer servers 24 also may include at least one search engine and at least one central processing unit to conduct the operations as introduced in the present application. Alternatively, the search engine may be an external device to the one or more computer servers 24.

In some embodiments, the centralized server 24 may obtain data (e.g., the original data or the raw data) provided by the data provider device 21, and the data (e.g., the original data or the raw data) may be data collected by smart terminals in the unified format and/or unprocessed data collected by sensors, or third-party data downloaded by the cloud. For example, in the case of vehicle data, the third-party data may be data uploaded to the cloud after being processed by vehicle manufacturers.

For example, the centralized server 24 may receive one or more of 2 types of data based on data sources: type-I data and type-II data. The type-I data may be data directly received from the data generating party, e.g., from smart terminals or electronic control units (ECU) mounted on target devices, such as vehicles or medical devices, etc. Format of the type-I data may be the predetermined unified format of the original data by manufactures of the target devices. For example, when the target device is a vehicle, and the type-I data are tire pressure related data, the metadata or plaintext description data of the type-I data that the centralized server 24 received may be of a format as ["_p_vehicle": "Vehicle$4kPKdXjome", "time": 1501459200000], where "_p_vehicle" may refer to "vehicle identification," for example. This format of the type-I data is predefined by the pressure sensor mounted on the target vehicle. Sometimes, when necessary, the centralized server 24 may also receive the type-II data from the third-party data source or data provider. The type-II data may be data the centralized server 24 extracted and/or downloaded from a third-party data source, such as cloud, after receiving the type-I data. Format and definition of the type-II data may be predefined by the third-party data source, solely defined by the centralized server 24, or jointly-defined by the third-party data source and the centralized server 24. The type-II data may be accessorial or auxiliary data to the type-I data. For example, if the type-I data include a vehicle identification number (VIN) of the target vehicle, based on the VIN of the original data, the centralized server 24 may extract/download detailed information associated with the VIN from the third-party data source. The extracted/downloaded information may include, but not limited to, the model, color, interior, and configurations of the target vehicle, etc.

After the data provider sends the data from the data provider device 21 to the centralized server 24, the centralized server 24 may convert the data to the original data if the data are raw data. Otherwise, the centralized server 24 may conduct data integration to the metadata of the original data. For example, if the centralized server 24 received the type-II data as accessorial data to the type-I data received from the data provider or data provider device 21, the centralized server 24 may blend the metadata of the type-I data with type-II data using one or more extract, transform, and load (ETL) algorithms.

For example, the centralized server 24 may first blend and/or add the type-II information and the non-private contents of the type-I data. Then the centralized server 24 may re-organize, categorize, and/or convert the non-private contents to a more searchable form, such as organizing the non-private contents to a format including a plaintext section, an overview section, and an abstract section for future search. Additionally or alternatively, the centralized server 24 may classify the non-private contents into different pieces and mark these pieces with indexing labels, such as plaintext, overview, abstract and/or various keywords for search. After the ETL process, the non-private contents may be plaintext description data readily to be searched. Then, the original data may be converted and/or updated to data-to-be-processed, where the data-to-be-processed may include the cyphered data/texts of the raw data, the updated metadata obtained after the ETL process, as well as the verification data (e.g., a Hash value) of the raw data. Wherein the plaintext description data of the data-to-be-processed may also be called metadata of the data-to-be-processed.

The centralized server 24 may store the data-to-be-processed, or part of the data-to-be-processed in at least one database, local or remote. In some embodiments, the at least one database may be centralized database. Indexing and searching of the data-to-be-processed stored in centralized database through their metadata (plaintext description data) may be much more efficient than indexing and searching the data-to-be-processed if they are stored in a distributed manner.

Details of the above introduced content may be further described elsewhere in the present application.

In some embodiments, the data provider device 21 may collect the raw data periodically at a first period. To maximumly reduce the chance of alteration/tampering of the raw data, the raw data may be converted to the original data as soon as possible. Consequently, the basic size of the raw data being processed may be those collected within one first period. For example, the first period may be 10 minutes. One of ordinary skill in the art would understand that the first period may be any number of minutes and/or seconds. For example, the first period may be 1 minute, 2 minutes, 3 minutes, 4 minutes, 5 minutes, 6 minutes, 7 minutes, 8 minutes, 9 minutes, or any time period therebetween. Therefore, the first period may be the basic and finest granularity of the data sent to the centralized server 24 by the data provider device 21, which may be called a data unit or unit data.

The centralized server 24 receives the data unit from the data provider device 21, and then may conduct the above-mentioned ETL process to convert the data unit to unit-data-to-be-processed. Further, the centralized server 24 may periodically collect the unit data-to-be-processed at a second period to form a group of units-data-to-be-processed. Here, the second period may be greater than the first period. For example, the first period may be 10 minutes, and the second period may be 60 minutes, consequently, the group may include 6 units of data-to-be-processed.

Next, the centralized server 24 may collect the Hash value of each individual unit of data-to-be-processed in the group, and then determine a root Hash value of the individual Hash values in the group, called group Hash value. The centralized server 24 may then upload the group Hash value to the blockchain 23. Further, the centralized server 24 may also upload the Hash values of the individual data units in the group to the blockchain 23. For example, the centralized server 24 may store the group Hash value as a root node of a Merkle tree, and store the Hash values of the individual data units as leaf nodes of the Merkle tree.

Here, a Merkle tree may be a data structure tree where each non-leaf node is a Hash of its respective child nodes. When implemented in blockchains, Merkle trees may allow the blockchains to scale while also providing the hash-based architecture for them to maintain data integrity and a trivial way to verify the integrity of data.

Because the above Hash values may be stored in multiple blocks and/or nodes in the blockchain 23, the Hash values, or part of the original data, may be stored in a distributed manner.

As may be seen from the introduction above, the centralized server 24 may store the data-to-be-processed in dual-manner. For one thing, the centralized server 24 may store the metadata (plaintext description data) of the data-to-be-processed as well as the cyphered/encrypted data in the centralized way to facilitate search and access efficiency. On the other hand, the Hash values of the data-to-be-processed may be stored in the blockchain in a distributed way, thereby ensure the integrity of the data-to-be-processed. Any small change and/or alteration of the raw data may result in huge difference in the Hash values of the corresponding branch in the Merkle tree.

When a data requestor wishes to purchase data from the centralized server 24, the data requestor may send the data request to the centralized server 24 through the data requestor device 22 and the at least one port/interface that connects to the centralized server 24. The centralized server may then conduct a data search according to the data request. For example, the at least one central processing unit may direct the search engine to search the plaintext description data of the data-to-be-processed, which are stored in the database (e.g., one or more centralized database). Specifically, the at least one central processing unit may direct the one or more search engines to search the indexing labels of the metadata of the data-to-be-processed and select at least one unit of target data to be transmitted (i.e., data to be transmitted) therefrom. Upon receiving a confirmation either from the data requestor, or from an instruction either automatically generated by the at least one central processing unit or by a smart contract running on the blockchain 23, the at least one central processing unit may proceed to activate the smart contract. Under the supervision and instruction of the smart contract, the at least one central processing unit may further transmit the target data to be transmitted to the data requestor.

Detailed description of the data selection and transmission procedure may be introduced elsewhere in the present application. Further, the below description may include further details of the above-mentioned systems, devices, and procedures.

The centralized server 24 may receive and locally store the data uploaded by the data provider device 21 or upload it to the blockchain 23. When the data requestor device 22 wants to purchase data, the smart contract may operate, through the blockchain 23, to monitoring data transmissions (e.g., a data transaction). The centralized server 24 may determine the data-to-be-processed based on different data provided by the data provider device 21, and the specific determining method may be described in detail later.

In some embodiments, the data provided by the data provider may be multiple categories of data. The data may be vehicle data, for example, tire pressure data and voltage data collected by the vehicle during operation, etc., or may be human body health data, for example, heart rate and blood pressure of the human body, etc.

As described above, based on the data provided by the data provider via the data provider device 21, the data-to-be-processed may be determined. Wherein, the plaintext description data in the data-to-be-processed may be data used for searching. For example, the plaintext description data may be data that are determined from the received data identified by the centralized server 24 or data determined after the centralized server 24 processes the data provided by the data provider. Details of processing the data will be described separately below.

In some embodiments, the original plaintext description data provided by the data provider may be used as the plaintext description data. The plaintext description data may also be referred to as metadata. The plaintext description data may be updated and/or modified data after being processed by the data provider. That is to say, the data from the data provider may include the original data, which may be data that were pre-processed by the data provider from raw data prior sending to the centralized computer server 24. Here, the raw data may be the data that are directly collected from sensors without being processed. Taking the vehicle data as an example, the data provider may be a vehicle-side intelligent hardware device, and the plaintext description data may be a metadata uploaded to the centralized server 24 after the raw data being processed by the vehicle-side intelligent hardware device. For example, in addition to the raw data, the plaintext description data may include a time period (e.g., a timestamp) during which the data was generated, an area (e.g., geographic location) from which the data was formed, a device by which the data was generated, and the like; or taking the health data as an example, the plaintext description data may be raw human data measured by the measuring instrument and uploaded to the centralized server 24 after being processed.

In some embodiments, the plaintext description data may be data processed by the centralized server 24 in the centralized server 24. The data provided by the data provider may include original plaintext description data, and the centralized server 24 may determine the data-to-be-processed based on the original plaintext description data provided by the data provider, and thereby determining the plaintext description data of the data-to-be-processed.

Specifically, determining, by the centralized server 24, the data-to-be-processed based on the data provided by the data provider may include: translating the original plaintext description data by using a data dictionary to obtain the plaintext description data. For example, the data collected by the sensor may be directly uploaded to the centralized server 24. The uploaded data may include "p_vehicle": "Vehicle$4kPKdXjome." The centralized server 24 may translate the original plaintext description data collected by the sensor using the data dictionary, and then convert the original plaintext description data into a translated plaintext description data corresponding to the original plaintext description data. For example, "p_vehicle": "Vehicle$4kPKdXjome" may be translated and converted into "vehicle identification": "Vehicle$4kPKdXjome," thereby obtaining plaintext description data corresponding to the original plaintext description data.

Additionally, as introduced above, the centralized server 24 may further increase the dimension of the original plaintext description data through one or more ETL algorithms, thereby increasing its searchability.

By processing the original plaintext description data through ETL and/or using the data dictionary to translate the original plaintext description data, the plaintext description data suitable for the search engine may be obtained, thereby facilitating the search of the search engine and improving the efficiency of the data search. Moreover, by translating the data to obtain the plaintext description data, the searchability of the data (i.e., the probability that the data may be searched, i.e., be found by a search engine) may be improved, and the search performance of the search engine may be improved.

In some embodiments, when a data requestor send specific data request to the centralized server 24, the centralized server 24 may direct a search engine to conduct data search in accordance with the data request. The search engine may conduct the search and provide search results for the data requestor. For example, the data requestor may select a specific time point "2018-11-11" (i.e., Nov. 11, 2018) through the search engine or through the one or more ports/interfaces connected to the centralized server 24, and the search engine may search the database (e.g., a centralized database) to obtain the corresponding data on Nov. 11, 2018 and feedbacks detailed search results to the data requestor, for example, the search results may include data type, tire pressure data and/or voltage data. It should be noted that this may merely be an example and may not necessary be a specific limitation on the searching method and the search results.

In some embodiments, the centralized server 24 or the search engine may receive a confirmation of the search result and proceed with further action. For example, after the data requestor confirms the search result, the smart contract running on the blockchain may be triggered and/or activated in response to the confirming operation on the search result. Alternatively, the centralized server 24 or the search engine may automatically determine whether the search result satisfy a criteria. If the centralized server 24 or the search engine determines that the search result meets the criteria, the centralized server 24 may automatically trigger and/or activate the smart contract stored and operates on the blockchain, via a blockchain port or interface connected to the centralized server 24. The criteria may be predetermined precondition for the activation of the smart contract. Further, the criteria may be generated by the data requestor and may then be send to the centralized server 24 or drafted into the smart contract by the centralized server 24 prior to, at the same time, or after the receipt of the data request by the centralized server 24 and/or search action of the search engine.

The blockchain may be a chained data structure in which data blocks are sequentially connected in a chronological order and may be a tamper-resistant and unforgeable distributed ledger guaranteed in a cryptographical manner. The blockchain may include public blockchain and private blockchain. Public blockchain may be a completely decentralized blockchain, and data uploaded to the public blockchain cannot be tampered with or altered.

A smart contract may be a piece of code that runs on the blockchain. The logic of the code defines the content of the smart contract. An account of the contract retains the running state of the contract. In some embodiments, the transaction process between the data requestor and the data provider may be restricted by the smart contract, and the transaction process may be controlled by the smart contract. The present disclosure does not limit the blockchain type on which the smart contract runs.

In some embodiments, the transaction object of the smart contract may be target data to be transmitted (e.g., transaction data), and the target data (e.g., the transaction data) may be encrypted data generated based on original content data provided by the data provider, and the original content data may be generated based on data collected by a collector device. The original content data provided by the data provider may be original plaintext data collected by a collector device such as a sensor or may be data that may be initially encrypted after being collected by the collector device. The centralized server 24 may perform different processing based on data provided by the data provider to generate the target data to be transmitted (e.g., transaction data).

Further, the target data to be transmitted (e.g., transaction data) may be different based on different data requestors. Specifically, it may be implemented by using various encryption mechanisms. For example, the target data to be transmitted (e.g., transaction data) may be generated by a proxy re-encryption mechanism. Specifically, a re-encryption key (e.g., rekey) may be generated by the centralized server 24 according to the public key provided by the data requestor device 22 and the private key of the data provider device 21; and in another embodiment, the re-encryption key may be generated by the data provider device 21 according to the public key provided by the data requestor device 22 and the private key of the data provider device 21 and then transferred to the centralized server 24. The original encrypted data may be re-encrypted by using the generated re-encryption key to generate the target data to be transmitted (e.g., transaction data). It should be noted that the original encrypted data refers to data obtained by initially encrypting the original plaintext data, and the original plaintext data may be the data obtained from the collector device 21. That is, the original encrypted data may be generated by the data provider device 21 or may be generated by the centralized server 24; the re-encryption of the original encrypted data may be performed on the data provider device 21 or may be performed on the centralized server 24.

That is, in the data packet provided by the data provider device 21 to the centralized server 24, the portion corresponding to the target data to be transmitted (e.g., transaction data) may be the original content data, the original content data may be the original encrypted data, or the original content data may also be the original plaintext data. The original plaintext data may be processed by the centralized server 24 to obtain the original encrypted data.

By generating a re-encryption key by using the public key of the data-requestor device and the private key of the data provider device and re-encrypting the encrypted data to generate target data to be transmitted (e.g., transaction data), only the data requestor device may decrypt the target data to be transmitted (e.g., transaction data) by its own private key to obtain the plaintext of the target data to be transmitted (e.g., transaction data), thereby improving the security of the data.

In some embodiments, the data-to-be-processed further may include verification data for verifying consistency between the target data to be transmitted (e.g., transaction data) and the original content data. The verification data may be data obtained by performing an irreversible algorithm on the original content data, for example, may be Hash data obtained by performing a Hash algorithm on the original content data. After the data transaction is successful, the data requestor may verify the authenticity of the original content data by verifying the data after obtaining the target data to be transmitted (e.g., transaction data) and decrypting the original content data.

In some embodiments, after triggering the smart contract running on the blockchain, the data processing method may further include: in response to the triggering of the smart contract, transmitting a storage address corresponding to the target data to be transmitted (e.g., transaction data) of the data requestor to the data requestor, the target data to be transmitted (e.g., transaction data) may be generated based on data provided by the data provider.

The embodiment for generating the target data to be transmitted (e.g., transaction data) may utilize the method as described above, or may utilize other methods, which is limited herein.

In some embodiments, the target data to be transmitted (e.g., transaction data) may be generated based on data provided by the data provider, and the storage addresses of the stored target data to be transmitted (e.g., transaction data) may be different based on different data requestors. The term of the storage address of the stored target data to be transmitted (e.g., transaction data) may be valid within a certain period of time according to the setting.

Based on different data requestors, the storage address of the storage target data to be transmitted (e.g., transaction data) may be different, so that only the corresponding data requestor may know the storage address of the data and obtain the stored target data to be transmitted (e.g., transaction data) from the storage address, thereby ensuring the security of the data.

In some embodiments, the data processing method may further include: uploading the verification data to the blockchain. Specifically, after the verification data is generated, the verification data may be uploaded to the blockchain directly. In other embodiments, it may be uploaded to the centralized server 24, and uploaded to the blockchain after being processed by the centralized server 24.

The data provided by different data providers may be different, for example, when the data provider device 21 may be a smart terminal or a cloud third party, the data provided by the data provider may include original plaintext description data, verification data, and original encrypted data, and when the data provider device 21 may be a device with a weak data processing capability, such as a sensor, or a cloud third party, the data provided by the data provider may include only the original plaintext description data. In some embodiments, after obtaining the original plaintext description data, the verification data, and the original encrypted data according to the data provided by the data provider, the original plaintext description data, the verification data, and the original encrypted data may be uploaded to the blockchain. Specifically, the original plaintext description data, the verification data, and the original encrypted data are uploaded together after being generated, or only verification data may be uploaded to the blockchain, which is limited herein.

By generating verification data for verifying the consistency between the target data to be transmitted (e.g., transaction data) and the original content data and uploading the verification data to the blockchain, the data requestor may verify the purchased data according to the verification data on the blockchain after the data is transmitted (e.g., traded) and may verify the reliability of the purchased original content data since the verification data for verifying the original content data uploaded to the blockchain cannot be changed.

In some embodiments, the verification data may be provided by the data provider device 21, such as a smart terminal or a cloud, and the data provided by the data provider may include the plaintext description data and the verification data generated corresponding to the data collected by the collector device, the centralized server 24 may obtain the verification data by identifying the data provided by the data provider. Specifically, the verification data may be determined by identifying data provided by the data provider to obtain corresponding plaintext description data and the verification data.

Figure 3:
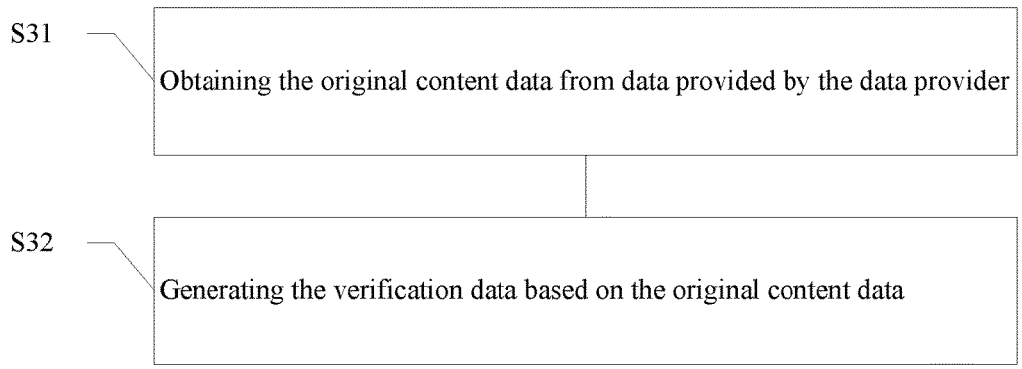
FIG. 3 is a flowchart illustrating a method for determining verification data according to embodiments of the present disclosure.

In another embodiment, the verification data may be generated by the centralized server 24. Specifically, the data provided by the data provider may include the original content data, for example, the data uploaded from a sensor, or the third-party data downloaded from the cloud. The centralized server 24 may generate verification data and plaintext description data based on the original content data. Referring to FIG. 3, in some embodiments, the verification data may be determined by:

Step S31, obtaining the original content data from data provided by the data provider;

Step S32, generating the verification data based on the original content data.

As described above, the original content data provided by the data provider may be original plaintext data, that is, data collected by sensors, or raw data. In this application scenario, the verification data may be generated by the centralized server 24. The verification data may be generated after performing an irreversible Hash algorithm on the original plaintext data. The specific Hash algorithm may be SHA256 or SHA3, which is not specifically limited herein. The generated verification data may be used to verify the authenticity of the original content data obtained from the data provided by the data provider.

Figure 4:
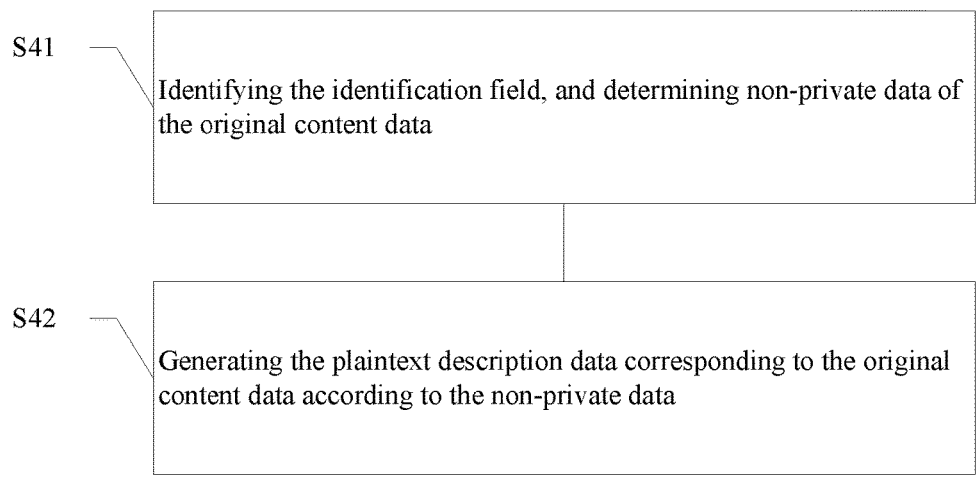
FIG. 4 is a flowchart illustrating a method for determining plaintext description data according to embodiments of the present disclosure.

In some embodiments, when the original content data provided by the data provider may be the original plaintext data, the centralized server 24 processes the original plaintext data to obtain plaintext description data. The original content data may include an identification field and data corresponding to the identification field. For example, the identification field may be "data," "date," and the data corresponding to the identification field may be specific data content, and the identification field and the specific data content may be determined according to requirements, which are not limited herein. Referring to FIG. 4, the plaintext description data may be determined as follows:

Step S41, identifying the identification field, and determining non-private data of the original content data;

Step S42, generating the plaintext description data corresponding to the original content data according to the non-private data.

Distinguishing the non-private data in the original content data by using the identification field of the original content data, generating the plaintext description data corresponding to the original content data according to the non-private data, and only finding the data provider's non-private data when the search engine performs the plaintext description data search may thereby protect data security for data providers.

Figure 5:
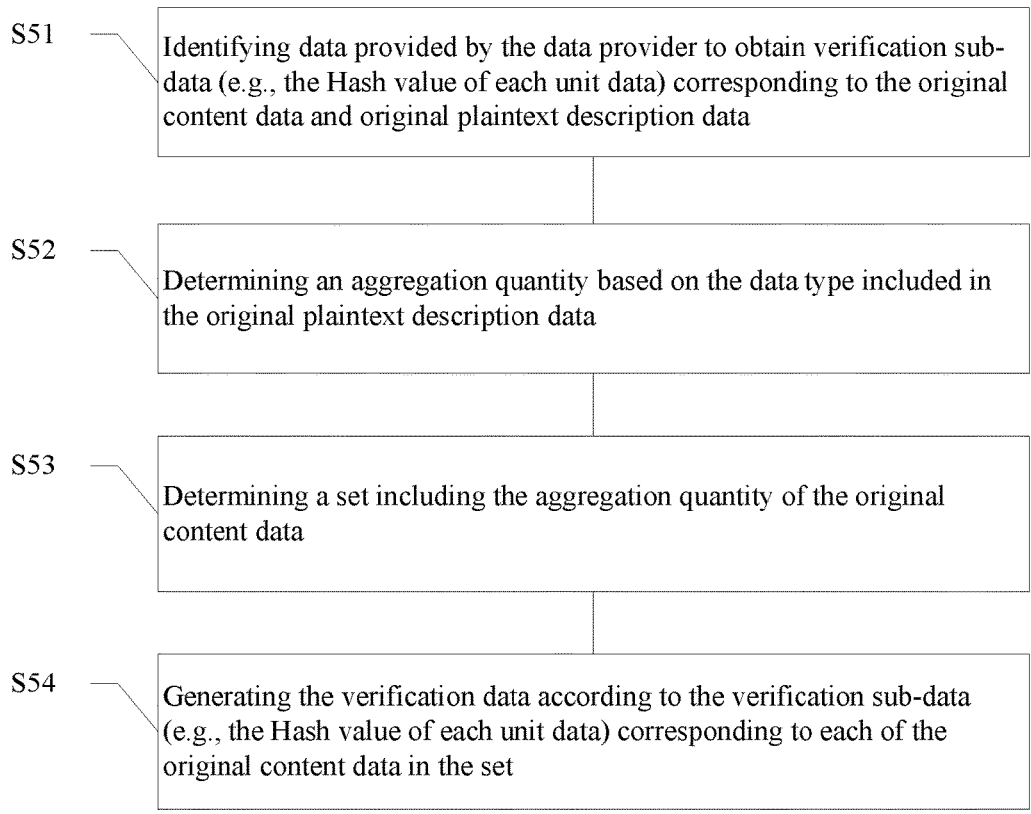
FIG. 5 is a flowchart illustrating another method for determining verification data according to embodiments of the present disclosure.

In some embodiments, the data provided by the data provider may be data collected and uploaded in real time, and the granularity of the generated data may be smaller. The original content data provided by the data provider and the verification sub-data (e.g., the Hash value of each unit data) may be aggregated by considering the attributes of the data and the requirements of the corresponding data requestor, and then the verification data for verifying the consistency between the target data to be transmitted (e.g., transaction data) and the original content data may be generated. Specifically, referring to FIG. 5, determining verification data for verifying consistency between the target data to be transmitted (e.g., transaction data) and original content data may include:

Step S51, identifying data provided by the data provider to obtain verification sub-data (e.g., the Hash value of each unit data) corresponding to the original content data and original plaintext description data;

Step S52, determining an aggregation quantity based on the data type included in the original plaintext description data;

Step S53, determining a set including the aggregation quantity of the original content data;

Step S54: generating the verification data according to the verification sub-data (e.g., the Hash value of each unit data) corresponding to each of the original content data in the set.

For example, the collector device generates one original content data per one minute and generates verification sub-data (e.g., the Hash value of each unit data) corresponding to the original content data. The centralization server 24 aggregates based on one hour and maps 60 verification sub-data (e.g., the Hash value of each unit data) of the original content data corresponding to one hour to the root node of the Merkel tree, and then generates the verification data corresponding to the 60 verification sub-data (e.g., the Hash value of each unit data) through the Merkel tree. The generated verification data may be used to verify the consistency between 60 target data to be transmitted (e.g., transaction data) and corresponding 60 original content data.

It should be noted that the "Meckel tree", "one minute", "one hour", "60" and the like described herein are merely illustrative and are not specific limitations on the aggregation manner and the aggregation data.

Correspondingly, the plaintext description data may be generated based on the set of the original content data including the aggregation quantity and the corresponding original plaintext description data.

For example, the centralized server 24 obtains the original content data, and the verification sub-data (e.g., the Hash value of each unit data) and the original plaintext description data corresponding to the original content data. The original plaintext description data of the original 60 content data may be aggregated when the centralized server 24 aggregates the 60 verification sub-data, which may be aggregated according to time points to generate plaintext description data corresponding to the time period.

In some embodiments, after the plaintext description data may be generated, the original plaintext description data corresponding to the plaintext description data may be searched when the search engine searches the plaintext description data. For example, taking the car data as an example, the plaintext description data may be plaintext description data corresponding to 60 original content data generated during 11:00-12:00 on Nov. 11, 2018. After the data requestor searches for the plaintext description data during 11:00-12:00 on Nov. 11, 2018 through the search engine, may associate with 60 original plaintext description data corresponding to 60 original content data during 11:00-12:00 on Nov. 11, 2018. During the subsequent transaction, the centralized server 24 may acquire the original content data corresponding to the 60 original plaintext description data.

Figure 6:
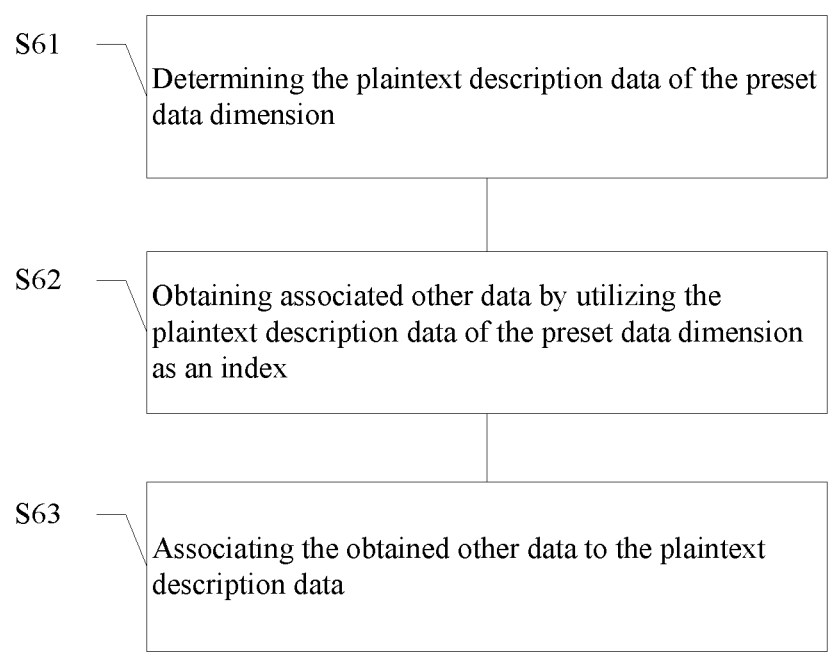
FIG. 6 is a flowchart illustrating a data dimension expansion method according to embodiments of the present disclosure.

In some embodiments, in order to improve the convenience of data search by the data requestor, the centralized server 24 determines the data-to-be-processed based on the data provided by the data provider, thereby extending the data dimension of the plaintext description data for searching by the search engine. Referring to FIG. 6, specifically, determining data-to-be-processed based on data provided by the data provider may include:

Step S61, determining the plaintext description data of the preset data dimension;

Step S62: obtaining associated other data by utilizing the plaintext description data of the preset data dimension as an index.

Step S63: associating the obtained other data to the plaintext description data.

Taking the vehicle data as an example, the preset data dimension may be a vehicle identification number of the vehicle, and the plaintext description data of the preset data dimension may be various, for example, YV1/YV2, and the centralized server 24 utilizes the specific vehicle identification number as an index to obtain information corresponding to the vehicle identification number, such as a vehicle model, a vehicle origin, a vehicle age, and the like, and associates the obtained information to the plaintext description data of the vehicle data, thereby extending a data dimension of the plaintext description data of the vehicle data.

Obtaining other data associated with the preset data dimension by using a data dimension preset by the plaintext description data as an index, and associating into the plaintext description data, thereby the data dimension of the plaintext description data may be extended. The search engine may search data from more data dimensions, which may increase the probability that data will be searched. Moreover, data searched from more data dimensions may also improve the accuracy of data search.

Figure 7:
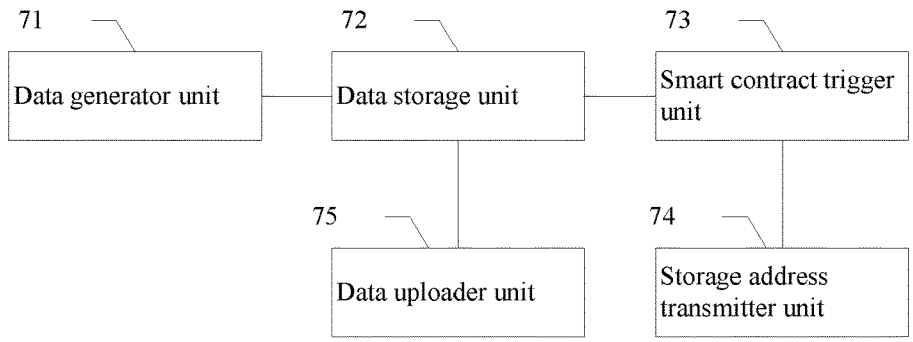
FIG. 7 is a schematic structural diagram illustrating a data processing apparatus according to embodiments of the present disclosure.

The embodiment further provides a data processing apparatus, and a schematic structural diagram thereof may be shown in FIG. 7. The data processing apparatus may include:

a data generator unit 71 configured to determine data-to-be-processed based on data provided by the data provider, the data-to-be-processed may include plaintext description data;

a data storage unit 72 configured to store the plaintext description data to a database, the database may be used to support a search engine;

a smart contract trigger unit 73 configured to trigger a smart contract running on the blockchain in response to the data requestor confirming the search result from the search engine, the smart contract may include communication and records between the data requestor and the data provider.

In some embodiments, the data processing apparatus may further include a storage address transmitter unit 74 configured to transmit a storage address corresponding to target data to be transmitted (e.g., transaction data) of the data requestor to the data requestor in response to the triggering of the smart contract after triggering the smart contract running on the blockchain, the target data to be transmitted (e.g., transaction data) may be generated based on the data provided by the data provider.

Figure 8:
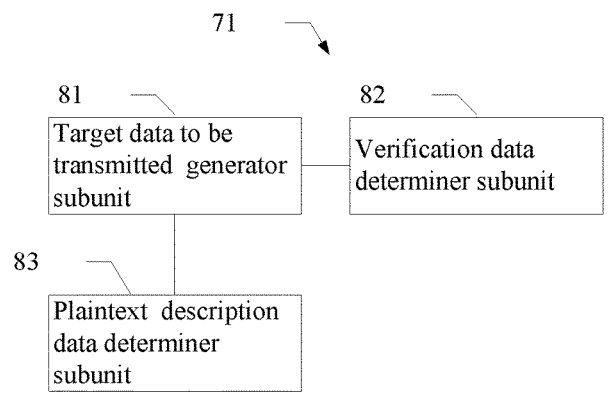
FIG. 8 is a schematic structural diagram illustrating a data generator unit according to embodiments of the present disclosure.

Referring to FIG. 7 and FIG. 8, in some embodiments, the transaction object of the smart contract may be target data to be transmitted (e.g., transaction data), and the data generator unit 71 may include:

a target data to be transmitted (e.g., transaction data) generator subunit 81 configured to generate encrypted data based on original content data provided by the data provider, the original content data may be generated based on data collected by the collector device, the target data to be transmitted (e.g., transaction data) may be the encrypted data;

a verification data determiner subunit 82 configured to determine verification data for verifying consistency between the target data to be transmitted (e.g., transaction data) and the original content data, the data-to-be-processed further may include verification data;

the data processing apparatus may further include: a data uploader unit 75 configured to upload the verification data to the blockchain.

In some embodiments, the data provided by the data provider may include the plaintext description data and the verification data generated corresponding to the data collected by the collector device, and the verification data determiner subunit 82 may be configured to identify data provided by the data provider to obtain the plaintext description data corresponding to the original content data and the verification data.

Figure 9:
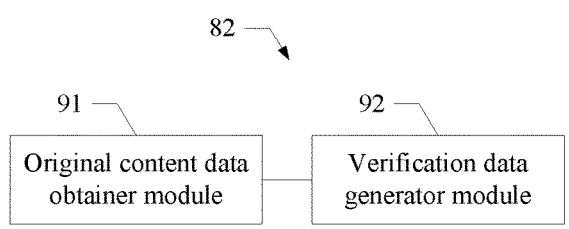
FIG. 9 is a schematic structural diagram illustrating a verification data determiner subunit according to embodiments of the present disclosure.

With reference to FIG. 8 and FIG. 9, in another embodiment of the present disclosure, the data provided by the data provider may include the original content data, and the verification data determiner subunit 82 may include:

an original content data obtainer module 91 configured to obtain the original content data from data provided by the data provider;

a verification data generator module 92 configured to generate the verification data based on the original content data.

With reference to FIG. 8, in some embodiments, the original content data may include an identification field and data corresponding to the identification field, and the data generator unit 71 may further include a plaintext description data determiner subunit 83 configured to determine the plaintext description data.

Figure 10:
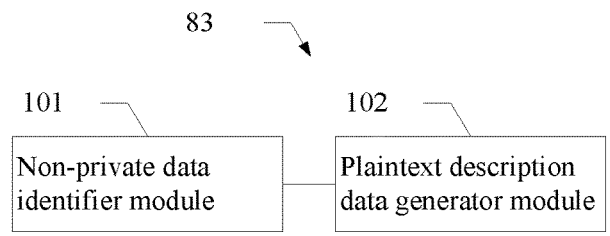
FIG. 10 is a schematic structural diagram illustrating a plaintext description data determiner subunit according to embodiments of the present disclosure.

Wherein, the plaintext description data determiner subunit 83 may include a plurality of modules. Referring to FIG. 8 and FIG. 10 together, the plaintext description data determiner subunit 83 may include:

a non-private data identifier module 101 configured to identify the identification field to distinguish the non-private data of the original content data;

the plaintext description data generator module 102 configured to generate the plaintext description data corresponding to the original content data based on the non-private data.

Figure 11:
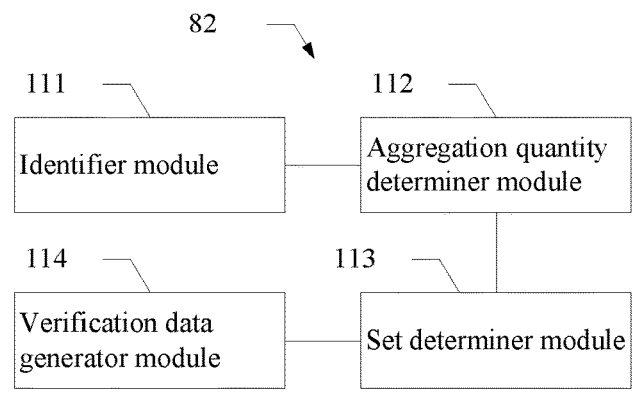
FIG. 11 is a schematic structural diagram illustrating another verification data determiner subunit according to embodiments of the present disclosure.

Referring to FIG. 8 and FIG. 11, in another embodiment, the verification data determiner subunit 82 may include:

an identifier module 111 configured to identify data provided by the data provider to obtain verification sub-data (e.g., the Hash value of each unit data) corresponding to the original content data and original plaintext description data;

an aggregation quantity determiner module 112 configured to determine an aggregation quantity based on data types included in the original plaintext description data;

a set determiner module 113 configured to determine a set of the original content data including the aggregation quantity;

a verification data generator module 114 configured to generate the verification data based on the verification sub-data (e.g., the Hash value of each unit data) corresponding to each of the original content data in the set.

In some embodiments, the plaintext description data may be generated based on the set of the original content data including the aggregation quantity and corresponding original plaintext description data.

Figure 12:
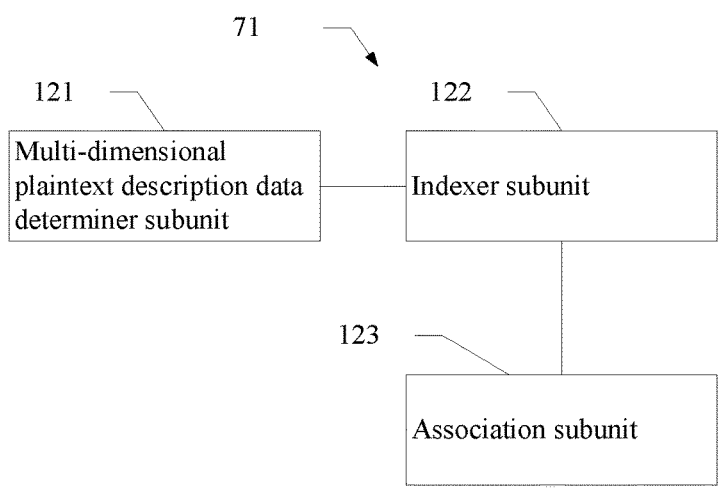
FIG. 12 is a schematic structural diagram illustrating another data generator unit according to embodiments of the present disclosure.

Referring to FIG. 7 and FIG. 12, in some embodiments, the data generator unit 71 may include:

a multi-dimensional plaintext description data determiner subunit 121 configured to determine the plaintext description data of a preset data dimension;

an indexer subunit 122 configured to obtain associated other data by using the plaintext description data of the preset data dimension as an index;

an association subunit 123 configured to associate obtained other data to the plaintext description data.

In some embodiments, the data provided by the data provider may include original plaintext description data, and the data generator unit 71 may include: a translator subunit configured to translate the original plaintext description data by using a data dictionary to obtain the plaintext description data.

The explanation of the terms, the working principles, the specific implementations, and the beneficial effects of the data processing apparatus in some embodiments may refer to the data processing method in some embodiments, and details are not described herein again.

The embodiment further provides a computer readable storage medium, where computer instructions are stored, and the steps of the data processing method may be executed when the computer instruction being performed. For details, refer to the foregoing embodiments, and details are not described herein again.

The computer readable storage medium may be an optical disk, a mechanical hard disk, a solid state hard disk, or the like.

The embodiment further provides a terminal, comprising a memory with computer instructions stored thereon and a processor, the computer instructions are executable on the processor, and when executed by the processor, perform the steps of the data processing method. Specific steps may refer to the abovementioned embodiments and details are not described herein again.

This written description uses examples to disclose the invention, including the best mode, and also to enable any person skilled in the art to practice the invention, including making and using any devices or systems and performing any incorporated methods. The patentable scope of the invention may be defined by the claims, and may include other examples that occur to those skilled in the art. Such other examples are intended to be within the scope of the claims if they have structural components that do not differ from the literal language of the claims, or if they include equivalent structural components with insubstantial differences from the literal languages of the claims.

What is claimed is:

1. A system for communicating with a blockchain, comprising:
one or more blockchain interfaces configured to connected to the blockchain;
one or more requestor interfaces configured to interact with a data requestor;
one or more search engines configured to access a database stored in one or more centralized storage units; and
one or more computer servers in connection with:
the one or mere blockchain, via the one or more blockchain interface, to communicate with the blockchain,
the one or more requestor interfaces to communicate with the data requestor; and
the one or more search engines,
wherein during operation, the one or more computer servers:
receive at least one unit of original data from at least one data provider, wherein each of the at least one unit of the original data includes non-private plaintext data, cyphered data, and verification data associated with the cyphered data;
for each unit of the at least one unit of original data, process the original data into data-to-be-processed by:
identifying the non-private plaintext data from the original data, and
updating the non-private plaintext data by adding additional non-private content associated with the non-private plaintext data into the non-private plaintext data;
extract index information from the updated non-private plaintext data for search;
add one or more indexing labels to the updated non-private plaintext data according to the index information;
direct the one or more search engines to select target data from the database stored in one or more centralized storage units based on the one or more indexing labels of at least one unit of data-to-be-processed according to a search request associated with the data requestor;
activate a smart contract stored and running on the blockchain; and
conduct operations with respect to the target data according to instructions sent by the smart contract from the blockchain.

2. The system of claim 1, wherein to operate according to instructions sent by the smart contract from the blockchain, the one or more computer servers further transmit one or more storage addresses of the target data to the data requestor according to the smart contract running on the blockchain.

3. The system of claim 1, wherein during operation, the one or more computer servers further:
  receive a data request from the data requestor;
  upload the data request to the blockchain via the one or more blockchain interfaces to generate the smart contract on the blockchain, wherein the smart contract includes a set of instructions to direct the one or more computer servers, via the one or more blockchain interfaces, to conduct predetermined operations.

4. The system of claim 3, wherein the data request includes the search request and a requirement to a search result associated with the search request;
  the predetermined operations include:
  determining whether the target data meet the requirement;
  in responding to a determination that the target data meet the requirement, send an activation signal to the smart contract via one of the blockchain interfaces to activate the smart contract.

5. The system of claim 4, wherein the determining whether the target data meet the requirement includes at least one of:
  receiving an instruction from the data requestor indicating whether the target data meet the requirement; or
  automatically comparing the target data with a preset criterion associated with the requirement in the smart contract.

6. The system of claim 4, wherein the predetermined operations further include directing the one or more search engines to conduct a selection from the database based on the search request.

7. The system of claim 1, wherein the one or more servers further:
  obtain the verification data; and
  upload the verification data to the blockchain.

8. The system of claim 1, wherein each unit of the at least one unit of original data is obtained by: receiving raw data directly measured from a target device:
  identifying the non-private plaintext data from the raw data;
  cyphering the raw data into the cyphered data;
  transforming the raw data to the verification data.

9. The system of claim 1, wherein the one or more computer servers further:
  transform all verification data in the target data to a root verification data;
  upload the root verification data to the blockchain; and
  send the root verification data to the data requestor according to the instructions sent by the smart contract.

10. A method for communicating with a blockchain, comprising:
  determining, by an apparatus, data-to-be-processed based on data provided by a data provider, the data-to-be-processed includes plaintext description data;
  storing, by an apparatus, the plaintext description data to a centralized database, the database is searchable by a search engine; and
  receiving, by the apparatus, search results selected from the database from the search engine;
  in response to confirmation of the search results, triggering, by an apparatus, a smart contract running on the blockchain, the smart contract includes communication and records between the data requestor and the data provider,
  wherein the smart contract is configured to direct the apparatus to operate predetermined operations with respect to the search results,
  wherein the determining the data-to-be-processed based on the data provided by the data provider includes:
    determining the plaintext description data of a preset data dimension;
    obtaining other associated with the plaintext description data by utilizing the plaintext description data of the preset data dimension as an index;
    associating the obtained other data to the plaintext description data;
  wherein the predetermined operations include sending target data to the data requestor, the target data is the encrypted data generated based on original content data provided by the data provider, the original content data is generated based on data collected by a collector device; the data-to-be-processed further includes verification data configured to verify consistency between the target data and the original content data; and
  wherein the data-to-be-processed include the plaintext description data and the verification data generated corresponding to data collected by the collector device, and the verification data is determined by identifying data provided by the data provider and obtaining the corresponding plaintext description data and the verification data.

11. The method of claim 10, wherein the predetermined operations include sending target data to the data requestor; and
  the method further including:
  in response to the triggering, transmitting a storage address corresponding to the target data to the data requestor,
  wherein the target data is generated based on the data provided by the data provider.

12. The method of claim 10, further comprising:
  uploading the verification data to the blockchain.

13. The method of claim 12, wherein the data provided by the data provider includes the original content data, and the verification data is determined by obtaining the original content data from data provided by the data provider; and generating the verification data based on the original content data.

14. The method of claim 12, wherein the original content data include an identification field and data corresponding to the identification field, and
  the plaintext description data is determined by identifying the identification field to determine non-private plaintext data of the original content data; and generating the plaintext description data corresponding to the original content data based on the non-private data.

15. The method of claim 12, wherein the verification data is determined as follows:
  identifying data provided by the data provider to obtain verification sub-data corresponding to the original content data and original plaintext description data;
  determining an aggregation quantity based on data types included in the original plaintext description data;
  determining a set of the original content data including the aggregation quantity; and
  generating the verification data based on the verification sub-data corresponding to each of the original content data in the set.

16. The method of claim 15, wherein the plaintext description data is generated based on the set of the original content data including the aggregation quantity and corresponding to original plaintext description data.

17. The method of claim 10, wherein the data provided by the data provider includes original plaintext description data, and the determining the data-to-be-processed based on the data provided by the data provider comprises: translating the original plaintext description data by using a data dictionary to obtain the plaintext description data.

18. An apparatus for communicating with a blockchain, comprising:
- a data generator unit configured to:
- determine data-to-be-processed based on data provided by a data provider, the data-to-be-processed includes plaintext description data;
- a data storage unit configured to store the plaintext description data to a centralized database, the database is searchable by a search engine;
- a smart contract trigger unit configured to trigger a smart contract running on the blockchain in response to a confirmation of a search result, the smart contract includes communication and records between the data requestor and the data provider,
- wherein the smart contract is configured to direct the apparatus to operate predetermined operations with respect to the search result,
- wherein the data generator unit is configured to:
  - generate encrypted data based on original content data provided by the data provider, the original content data is generated based on data collected by a collector device, the target data is the encrypted data, and
  - determine verification data, wherein the verification data is configured to verify consistency between the target data and the original content data, the data-to-be-processed further includes the verification data;
- wherein the data generator unit is further configured to determined the plaintext description data by:
  - identifying the identification field to distinguish non-private data of the original content data; and
  - generating the plaintext description data corresponding to the original content data based on the non-private data; and
- wherein the data generator unit is further configured to:
  - determine the plaintext description data of a preset data dimension;
  - obtain other data associated with the plaintext description data by using the plaintext description data of the preset data dimension as an index;
  - associated the obtained other data to the plaintext description data.

19. The apparatus of claim 18, wherein the predetermined operations include sending target data to the data requestor; and
the apparatus further includes:
- a storage address transmitter unit, configured to transmit a storage address corresponding to the target data to the data requestor in response to the triggering of the smart contract,
- wherein the target data is generated based on the data provided by the data provider.

20. The apparatus of claim 18, wherein the predetermined operations include sending target data to the data requestor;
the apparatus further comprising a data uploader unit configured to upload the verification data to the blockchain.

21. The apparatus of claim 20, wherein the original content data include an identification field and data corresponding to the identification field.

22. The apparatus of claim 20, wherein the data generator unit is further configured to:
- identify data provided by the data provider to obtain verification sub-data corresponding to the original content data and original plaintext description data;
- determine an aggregation quantity based on data types included in the original plaintext description data;
- determine a set of the original content data including the aggregation quantity;
- generate the verification data based on the verification sub-data corresponding to each of the original content data in the set.

23. The apparatus of claim 22, wherein the plaintext description data is generated based on the set of the original content data including the aggregation quantity and corresponding to original plaintext description data.

24. The apparatus of claim 18, wherein the data provided by the data provider includes original plaintext description data, and
the data generator unit is configured to translate the original plaintext description data by using a data dictionary to obtain the plaintext description data.

* * * * *